W. MORRISON.
POWER TRANSMISSION SYSTEM AND MECHANISM.
APPLICATION FILED FEB. 14, 1916.

1,286,717.

Patented Dec. 3, 1918.
7 SHEETS—SHEET 3.

Witnesses:
Harry W. L. White

Inventor:
William Morrison
By Barnes Townsend & Brickenstein Attys

W. MORRISON.
POWER TRANSMISSION SYSTEM AND MECHANISM.
APPLICATION FILED FEB. 14, 1916.

1,286,717.

Patented Dec. 3, 1918
7 SHEETS—SHEET 6.

Witnesses:
Harry R. L. White.

Inventor:
William Morrison
By Byrnes Townsend & Brickenstein
Attys

UNITED STATES PATENT OFFICE.

WILLIAM MORRISON, OF CHICAGO, ILLINOIS.

POWER-TRANSMISSION SYSTEM AND MECHANISM.

1,286,717.   Specification of Letters Patent.   Patented Dec. 3, 1918.

Application filed February 14, 1916. Serial No. 78,235.

*To all whom it may concern:*

Be it known that I, WILLIAM MORRISON, a citizen of the United States, residing at Chicago, in the county of Cook and State of Illinois, have invented certain new and useful Improvements in Power-Transmission Systems and Mechanism, of which the following is a specification.

My invention relates to a power-transmission mechanism, primarily designed for automobiles, but capable of use in other relations, and comprises a speed-changing system in which the speed changes are effected in a semi-automatic manner. It further relates to the provision of a mechanism which permits the load to be readily disconnected and again connected with the prime mover, without stopping the rotation of the load driving member, this continued rotation having no effect on the prime mover. As applied to automobiles, this feature of my invention enables the automobile to "coast," with the engine shaft not in power-transmitting connection; and this "coasting" may take place at any speed, whether in high or low gear.

My invention further relates to the particular means by which these results are attained. It particularly relates to an electromagnetic control whereby the speed changes are effected by simply closing and opening the electric circuits to the electromagnets. It further relates to the means by which the changes of speed are effected without noise or jar, and without the necessity of bringing gears into and out of direct engagement.

My invention also relates to the combination with a speed-changing system having as one element thereof a yielding friction clutch, of flexible or yielding means for transmitting power from the engine shaft to the load, such yielding means being preferably an electromagnetic clutch, such as that of the dynamo-electric generating type shown in my prior patents hereinafter referred to. This combination enables the intermittent power impulses of a reciprocating engine to be transmitted to the load as a practically uniform and continuous torque, and because of the yielding elements, prevents transmission of shocks or jars from the engine to the load, or vice versa, whether such shocks and jars occur during the running of the automobile or changing of speeds in the power transmission.

The invention will be readily understood from the accompanying description and drawings, which are representations of the device as actually used.

Fig. 18 is a plan view of the chassis of an automobile equipped with my system.

Referring to the drawings, the entire mechanism is inclosed in a casing 1, made in sections for convenience of access to the parts. The casing is liquid tight and, in operation, contains lubricating oil, the casing having at its lower portion a partitioned sediment chamber 6.

Figures 2, 13:
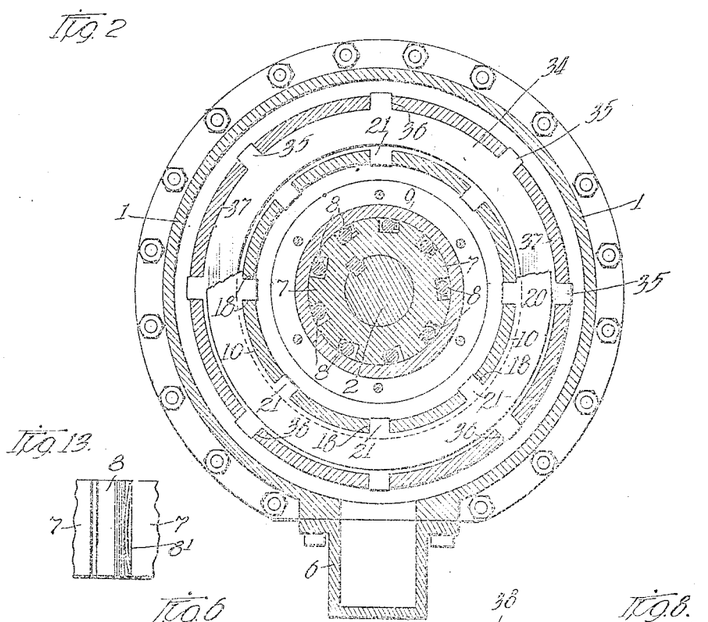
Fig. 2 is a transverse section on plane II—II of Fig. 1.
Fig. 13 is an enlarged detail view of one of the clutch rollers.
Figures 3, 4, 5:
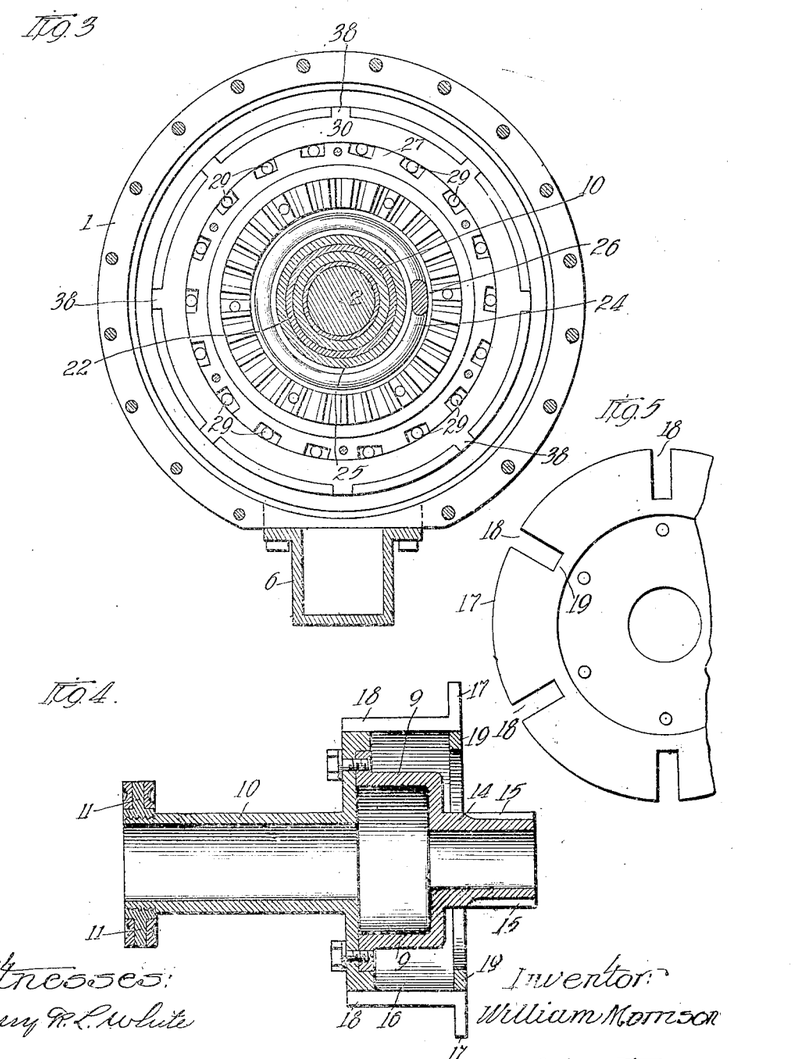
Fig. 3 is a transverse section on irregular plane III—III of Fig. 1.
Fig. 4 is a detail.
Fig. 5 is an end view of the drum 16.

The driving shaft 2 extends through the casing and is journaled at one end in the ball-bearing 3, and at the other in the sleeve 4, which is the power-transmitting member, this sleeve 4 being mounted in a ball-bearing 5. The driving shaft may be connected to any suitable source of power, but in use on an automobile, for which my invention is mainly designed, is preferably connected to the crank-shaft of a variable speed engine through a magnetic clutch, preferably of the dynamo-electric generating type shown in my Patents Nos. 1,126,059, 1,126,060 and 1,126,061, patented January 26, 1915. To the shaft 2 is keyed a roller-carrying member 7, having in its periphery a series of grooves having bottoms of a gradually increasing radial depth. In each groove is a roller 8, normally pressed toward the deeper portion of the groove by a flat spring 8'. Surrounding this roller-carrying member 7 is a driving-pinion-carrying sleeve structure, shown as a whole in Fig. 4, which constitutes the other member of a roller-clutch. This structure comprises (1) an inner drum 9 surrounding and bearing on the rollers 8, (2) a sleeve 10 journaled on the shaft 2, and having at its outer end a flanged abutment ring 11, having fastened thereto plates for the ball-bearings 12, 13, to be later referred to, (3), a second sleeve 14, also journaled on shaft 2, having at its outer end a gear 15, and (4) an outer drum 16 having an outwardly extending flange 17 and an inwardly extending flange 19. Slots 18 are, as shown in Fig. 5, cut radially through the flange and the periphery of the drum to receive depending lugs 21 of a series of annular flat friction rings 20 (Fig. 2).

Figure 7:
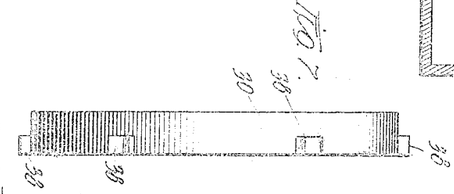
Figs. 7 and 8 are front and side elevations of clutch ring 30.
Figure 8:
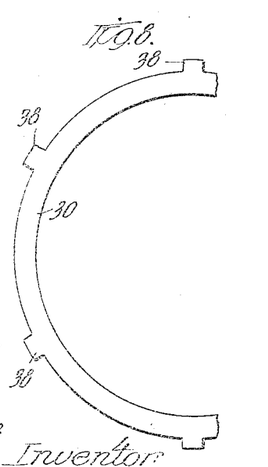
Figures 9, 10, 11, 12:
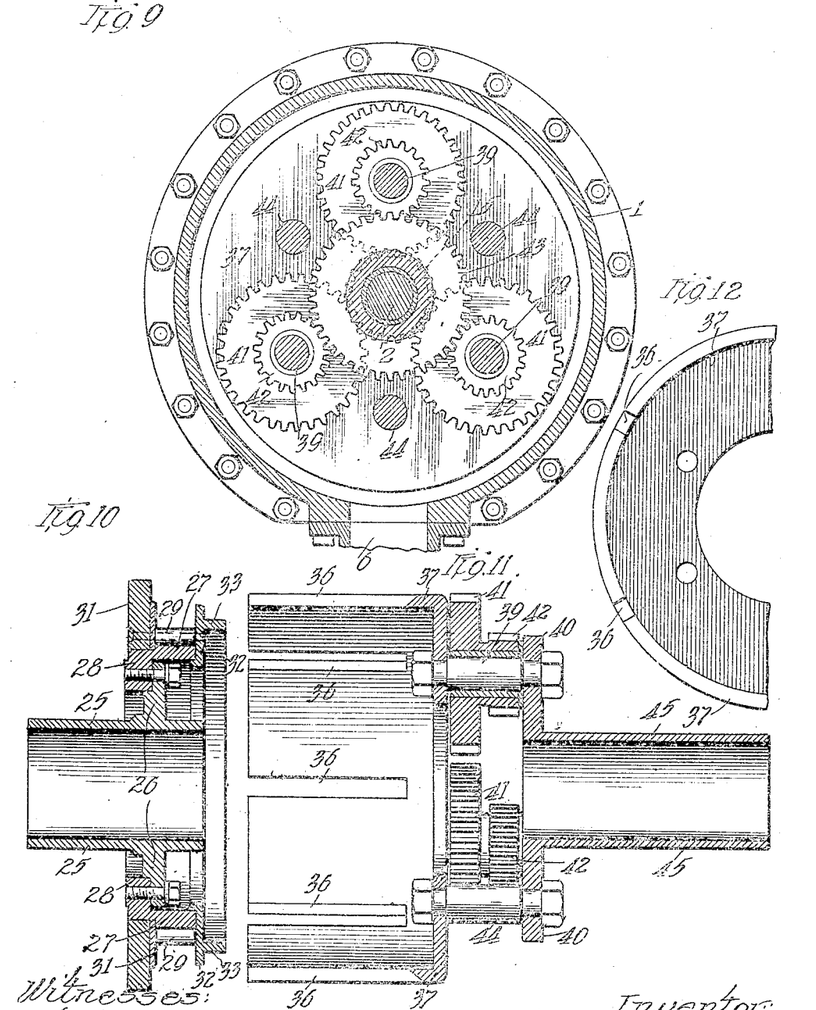
Fig. 9 is a cross-section on plane IX—IX of Fig. 1.
Fig. 10 is a detail view of the armature-carrying sleeve.
Fig. 11 is a detail view of the outer disk-drum.
Fig. 12 is an end view of Fig. 11.
Figure 14:
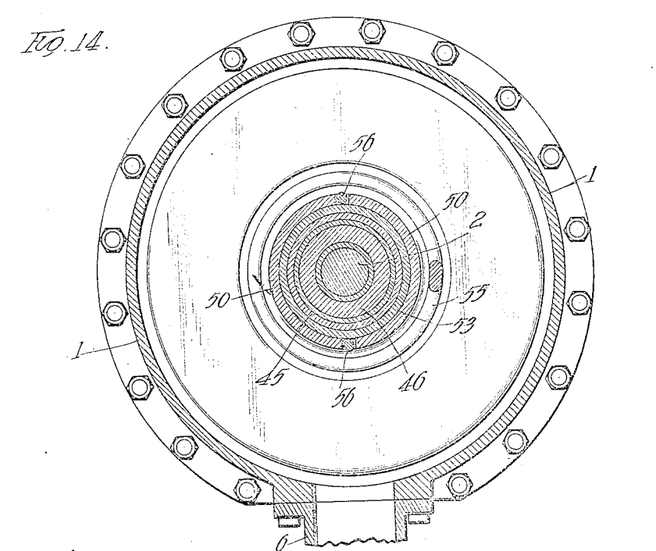
Fig. 14 is a cross-section on plane XIV—XIV of Fig. 1.
Figure 15:
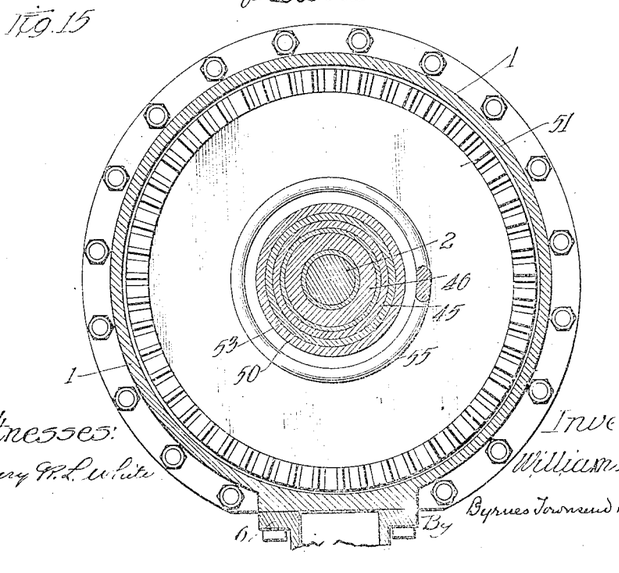
Fig. 15 is a cross-section on plane XV—XV of Fig. 1.
Figure 16:
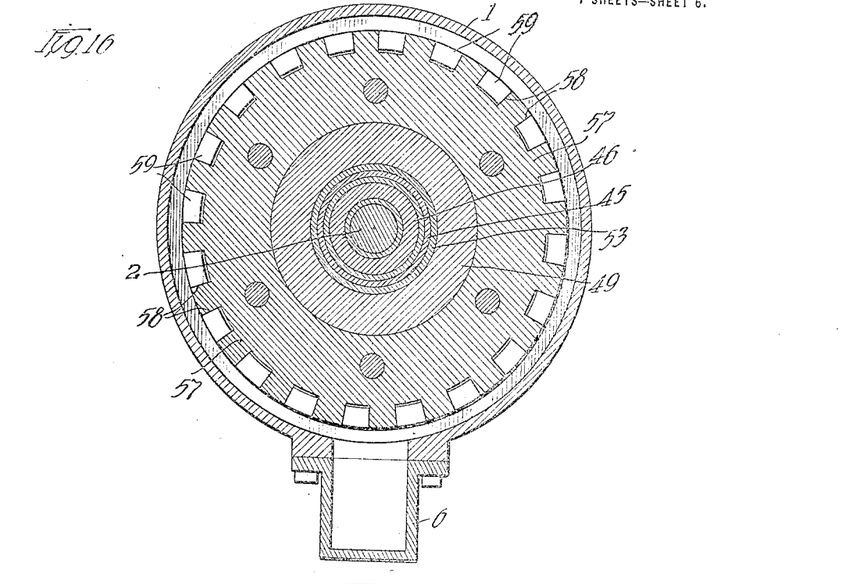
Fig. 16 is a cross-section on plane XVI—XVI of Fig. 1.
Figure 17:
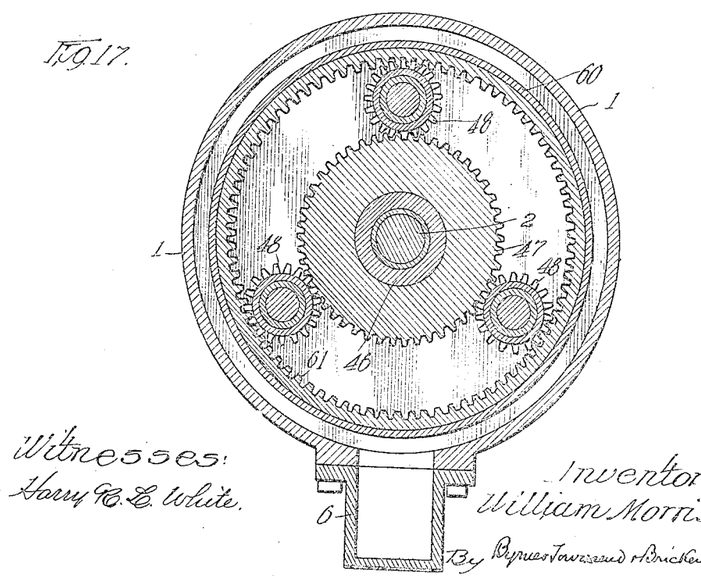
Fig. 17 is a cross-section on plane XVII—XVII of Fig. 1.

Surrounding sleeve 10 is a sleeve 22 having at its outer end an annular flange 23 bearing against roller-bearing 12 and acting as an abutment for a powerful spiral spring 24 which bears against a sliding armature structure, shown in detail in Fig. 10. This structure comprises a sleeve 25 having a flange 26, to which is bolted the ring-shaped roller-carrying member 27, to which is also secured the toothed ring 28. The rollers 29 are carried in cavities similar to those already described, and serve as loose clutching elements between the ring 27 and a ring 30 to be later referred to. A ring 31 fitting onto the ring 27 completes the armature face and is secured thereto by screws passing through the ring 27 and into an inner ring 32, having an inwardly extending flange 33, which bears against the disks of the friction clutch, this clutch consisting of disks 20 having lugs 21 engaging the slots 18 of drum 16, and of disks 34 having lugs 35 engaging slots 36 in a gear-carrying drum 37, whose left-hand end rests on ring 30 which has lugs 38 also engaging in slots 36 (see Figs. 1, 7 and 8).

The drum 37 carries at its right-hand end a number of shafts 39, bolted to a ring 40 carried by sleeve 45. The shafts 39 each carry a gear 41 and a pinion 42, the pinions 42 meshing with a gear 43. The ring 40 is secured to the end of drum 37, not only by the shafts 39, but also by additional bolts 44. The gear 43 is carried at one end of sleeve 46, which at its other end carries pinion 47 which meshes with a number of gears 48, mounted on the flange 49 of a sliding sleeve 50, which also carries the annular armature 51 for the magnet 52. The armature 51 and pole piece 70 are provided with interlocking teeth, preferably of the construction illustrated in Fig. 6, but reversely arranged. The gear-carrying sleeve 50 slides on a sleeve 53 having at one end a ring abutment 54, between which and the armature flange 51 is mounted a spiral spring 55. Secured in the abutment are pins 56 adapted to engage slots or openings in the end of sleeve 50, thereby preventing relative rotation of the abutment 54 and sleeve 50, while permitting relative longitudinal movement. The annular plate 57, secured to flange 49, has in its edge slots 58, with which engage corresponding teeth 59 on the drum 60, formed as part of the sleeve 4. To this drum 60 is secured an internal gear 61, with which mesh the gears 48; these gears 47, 48 and 61 constituting the reversing gear-train.

Figure 6:
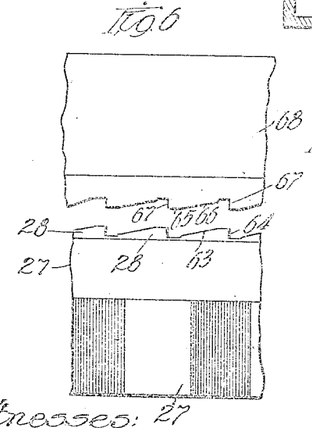
Fig. 6 is an enlarged detail view of the clutching teeth of the magnetic clutch.

In Fig. 6 are shown the preferred form of teeth for locking the parts in the speed-reducing relation. The teeth 28 on ring 27 have inclined portions 63 and abrupt faces 64, while the teeth 65 on the pole-piece 68 or other stationary part of the device have inclined portions 66 and abrupt faces 67. When the armature ring 27 is drawn up by energization of the magnet 69, if the teeth 28 should strike the inclined portion 66, they will slide along until faces 64 engage faces 67, when relative motion of the armature ring 27 and the pole-piece of the magnet 69 secured to the stationary casing is positively and mechanically prevented, the magnet serving mainly to retain the armature in its attracted position against the force of the spring 24.

All the rotative parts are arranged with a symmetrical disposition, so that they are practically balanced in any position.

The system as a whole comprises (1) a prime mover, such as a gas-engine, (2) a yielding connection between the prime mover and the driving shaft, preferably a dynamo-electric clutch of the double rotor type, one rotor connected to the engine shaft and the other to the driving shaft, (3) a speed-changing mechanism, which in turn drives (4) the propeller shaft, which delivers the power to the rear axle of the vehicle in the usual way, and, preferably, (5) a storage battery. The general arrangement of these parts is shown in Fig. 18, in which E is the engine having its shaft directly connected to one of the rotors of the dynamo-electric clutch F'. The other rotor is connected as by a flexible leather disk-coupling G, to the driving shaft 2 of the speed-changing mechanism within the casing 1. The driven shaft 4 of the speed-changing mechanism is connected by a universal joint H with the propeller shaft I, which is connected by universal joint K with the rear axle worm-drive L. M is a box secured to the steering post and containing switches for controlling the various electric circuits, such as those connected to the dynamo to cause it to start the engine, the circuit to the magnet controlling the low-gear, the circuit to the magnet controlling the reverse-gear, and a controller circuit; 86, 87, 88 and 89 are the handles by which these switches are operated.

N is a box containing the controller mechanism for the dynamo and battery circuits, and may be of the type shown in my application Serial No. 861,769 and No. 861,770, filed September 15, 1914.

O, O' are the storage batteries and F' is a dynamo-electric or magnetic clutch preferably of the type shown and described in my prior Patents, Nos. 1,126,059, 1,126,060, and 1,126,061, patented January 26, 1915, and need not here be further described.

The operation of the device is as follows:

*Direct drive.*—When the parts are in the position shown, the spring 24 has forced the disks of the disk-clutch together, thereby preventing relative movement of the speed-reducing gear-train; and the spring 55 has similarly locked the relatively movable parts of the reversing gear-train, so that the entire mechanism (except the always stationary magnets) within the casing, will rotate with the driving shaft when it is operated at such speed as to cause the over-running clutch to lock the sleeves 7 and 9. The sleeve 4 will thus be clutched to and directly driven by the driving shaft 2 and have the same direction of rotation. It will be noted, however, that when the shaft 2 and its ring 7 are stopped or rotated more slowly than the sleeve 9, the whole rotating mechanism is free to continue its rotation over or "overrun" the rollers 8, thus permitting the automobile to coast without power. As soon as power is again applied to the driving shaft, its speed gradually increases until it becomes equal to that of the rotating load, whereupon it again picks up the load without shock or jar.

Figure 1:
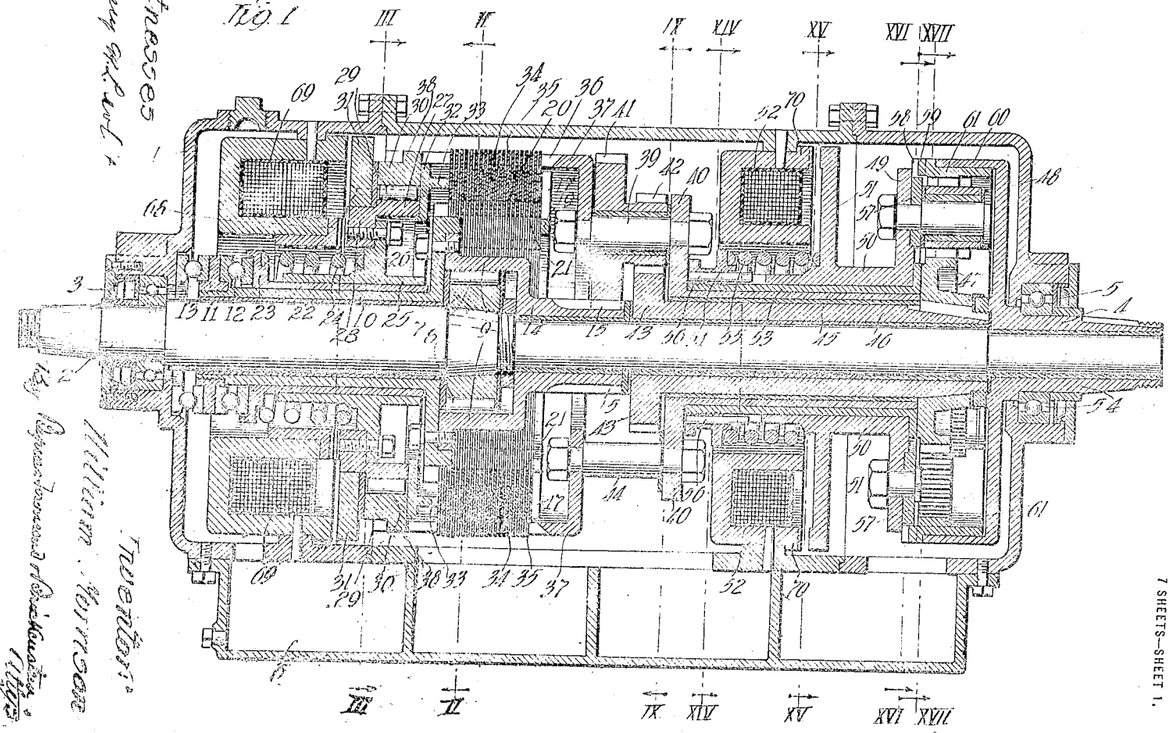
Figure 1 is a longitudinal transverse section through the device.

*Low-speed drive.*—In order to bring the speed-reducing gear-train into operation, the magnet 69 is energized and attracts the armature, which causes the parts connected thereto to slide to the left (Fig. 1). This movement causes engagement (Figs. 1 and 6) of teeth 28 and 65, thereby locking against rotation sleeve 25, ring 27, and plates 31 and 32; and also moves ring 33 to the left, thereby relieving the pressure on the friction disks and permitting relative rotation of the pinion-carrying drum 9 and gear-carrying drum 37. If, when the operation is effected, the shaft 2 is idle or running at a lower speed than the drum 9 (and its connected parts), the whole system may still rotate in the same direction, one overrunning clutch permitting the ring 30 to rotate over the rolls 29 and the other permitting sleeve 9 to rotate over rolls 8; but, as soon as the speed of the driving shaft exceeds that of drum 9, the clutching rolls come into action, whereupon the pinion 15 tries to drive gears 41 and 42 carried by the drum 37, which try to drive gear 43 attached to the load, and the resulting reaction causes ring 30 to tend to move backward, thereby causing the rolls 29 to lock together rings 27 and 30, thereby holding the drum 37 rigidly stationary. Power is now transmitted from shaft 2, through the gear-train 15, 41, 42 and 43, to the load shaft 4, which is rotated at reduced speed. This change of speed from high to low operation may be effected at any speed of the driving shaft, and all that is required of the operator is to move a switch to close the electric circuit to the electromagnet 69.

The particular advantage of the outer over-running clutch is that in going from high to low gear, i. e., with the car going at high speed, and therefore with considerable momentum, the whole mechanism, even after the pressure on the disks has been relieved, may still continue to rotate forwardly over the rolls 29, and the rolls 8, until the speed of the driving shaft has reached the point required by the new ratio of drive. There is thus obviated the sudden jar which would result if the relatively heavy and rapidly rotating parts were brought to a sudden stop, and time is given for the main shaft to increase its speed to the proper point to gradually again pick up the load.

Obviously, the automobile may be permitted to coast while running in low-gear, as well as in high-gear, by shutting off the power; and this ability to coast freely, when occasion offers, has been found to result in a material saving in gasolene.

The inner over-running clutch thus has a triple function: (1) it avoids shock when going from high-gear into low-gear, by permitting the whole mechanism to overrun both clutches, and thereby avoids a tendency to push the motor ahead when making the change; (2) it allows the machine to coast on high speed without driving the power mechanism; and (3) in going from low-gear to high-gear, after the speed of the driving shaft has been decreased by shutting off the power before the change of gear is made, time is allowed for the speed of the driving shaft to be increased until the proper clutching speed is reached.

*The reverse drive.*—To provide a reverse drive of the load-shaft, the magnet 52 is energized, thereby attracting its armature. This movement causes the teeth on the ring of armature 51 to positively engage the teeth on pole-piece 70, thereby holding against rotation the sleeve 50 and flange 49. At the same time, the teeth 58 and 59 are disengaged, thereby leaving the drum 60 and its internal gear free to rotate. The pinion 47, moving in a forward direction, drives, through the now stationary gears 48, the internal gear and sleeve 4 to which it is connected, in a reverse direction. Obviously, the reverse drive may be either with the transmission in low or high gear relation.

In going from a low-speed or low-gear drive to a high-speed direct drive, the operation is as follows:—The electromagnet 69 is deënergized, thereupon the spring forces the disks of the friction clutch into contact; there is a momentary slip between the disks until the friction is sufficient to lock the drum 9 to the drum 37, whereupon the high-gear connection is established.

To avoid the tendency to shock or jar, it is advisable, though not essential, to shut off the power while the operation is being effected, the driving-shaft speed being thereby at once lessened to that of the rotating sleeve, whereupon by again opening the throttle the power is again applied.

As above pointed out, this momentary closing of the throttle is not necessary, particularly when a yielding connection such as a magnetic or a dynamo-electric generating clutch is used between the prime-mover and driving shaft, as the frictional slip in the disk clutch and the yielding or slip in the other clutch has been found in practice to readily absorb any shock.

While I have described only two speed changes, it is obvious that several speed-reducing trains may be used in series, the driven shaft of one acting as the driving shaft of the next.

I have described in detail the actual mechanism which I have found in practice to be effective, but it is to be understood that my invention is not, except as specifically claimed, limited to the particular details of construction, as these may be widely varied without departing from the spirit of my invention.

Thus the roller-carrying members 7 and 27 constitute, with their coöperating parts, one type of what are known in the art as "over-running clutches," and I prefer to use this type, although I have found in practice that other types may be used.

The teeth 68 and 25 are shown as locking the coöperating parts in one direction only, in order that there may be a possibility of relative rotation in the other direction over the inclined faces 63 and 66, in case of necessity. These teeth may, however, be constructed to lock in both directions.

Or the holding power of the magnet may be so proportioned as to obviate altogether the use of locking teeth.

I claim:

1. In a power-transmission mechanism, a rotatable speed-changing gear system, a friction clutch, a stationary electromagnet, a movable armature member arranged to engage said clutch, a spring normally pressing said armature member against said clutch, and said armature member and a stationary member having coöperating teeth to prevent rotation of said armature member, whereby energizing the magnet opens the clutch and locks the armature against rotation, and deënergizing the magnet automatically locks the clutch.

2. In a power-transmission mechanism, a rotatable speed-changing gear system comprising members connected by a multiple-disk clutch, a spring arranged to normally apply pressure against the disks of said clutch, and an electromagnetic device for overpowering the spring to relieve the pressure on the clutch, said device having means for mechanically preventing rotation of one of the released members.

3. In a power-transmission mechanism, a rotatable driving member having a pinion, a rotatable driven member having a gear, a speed-changing mechanism connecting said pinion and gear comprising a rotatable carrying member, a spring-pressed friction clutch connecting the driving member and the rotatable carrying member, means for overcoming the spring pressure to open the clutch, and means for locking said rotatable carrying member against rotation comprising a stationary locking element and a rotatable spring-carrying locking element.

4. In a power-transmission mechanism, a rotatable driving member having a pinion, a rotatable driven member having a gear, a speed-changing mechanism connecting said pinion and gear comprising a rotatable carrying member, a spring-pressed friction clutch connecting the driving member and the rotatable carrying member, means for overcoming the spring pressure to open the clutch, means for locking said rotatable carrying member against rotation comprising a stationary locking element and a rotatable spring-carrying locking element, and an over-running clutch between the rotatable locking element and the rotatable carrying member.

5. In a power-transmission mechanism, a rotatable driving member, a rotatable driven member, gear train for transmitting motion from one to the other, a driving shaft, and an over-running clutch between the driving shaft and driving member for driving the driving member from the driving shaft.

6. In a power-transmission mechanism, a rotatable driving member, a rotatable driven member, a gearing for transmitting motion from one to the other, a rotatable member carrying said gearing, a rotatable clutch for holding against relative rotation the driving member and gear-carrying member, a driving shaft and an over-running clutch between the driving shaft and driving member.

7. In a power-transmission mechanism, a rotatable driving member, a rotatable driven member, gearing for transmitting motion from one to the other, a rotatable member carrying said gearing, a rotatable clutch for holding against relative rotation the driving member and gear-carrying member, a driving shaft, an over-running clutch between the driving shaft and driving member, and means for releasing the rotatable clutch and holding against rotation one member of the gearing.

8. In a power-transmission mechanism, a rotatable driving member, a rotatable driven member, gearing for transmitting motion from one to the other, a member carrying said gearing, a friction clutch for holding against relative rotation the driving member and gear-carrying member, a driving shaft, an over-running clutch between the driving shaft and driving member, and means for releasing the friction clutch and holding against rotation one member of the gearing.

9. In a power-transmission mechanism, a driving shaft, a driven shaft, a speed changing gearing system arranged to rotate as a whole about said driving shaft, and an over-running clutch connection between the driving shaft and said speed changing system for driving the speed changing system from the driving shaft.

10. In a gear-transmission system, a driving shaft, a driving member for the gear system having a pinion, and an over-running clutch between the shaft and driving member, whereby the gear system may be timed prior to changing gear ratios and coasting of the load is permitted without driving the driving shaft.

11. In a power-transmission mechanism, a driving shaft, a driven shaft, a speed-changing gear system arranged to rotate as a whole about said driving shaft, means for holding against rotation one element of the speed-changing gear, and an over-running clutch between said element and said holding means.

12. In a power-transmission mechanism, a driving shaft, a driven shaft, a speed-changing gear system arranged to rotate as a whole about said driving shaft, means for holding against rotation one element of the speed-changing gear, an over-running clutch between said element and said holding means, and a second over-running clutch between the driving shaft and the rotating gear system.

13. In a power-transmission mechanism, a rotatable speed-changing system, means for locking a member of said system against rotation, said means comprising stationary and movable elements having coöperating locking devices and also a roller clutch between said movable element and said member, said clutch permitting rotation in one direction only, whereby said rotatable member is permitted to rotate in one direction on said movable element when locked, but rotation in the opposite direction is prevented.

14. In a power-transmission mechanism, a rotatable speed-changing system, means for locking a member of said system against rotation, said means comprising stationary and movable elements having coöperating locking devices and also a roller clutch between said movable element and said member, said clutch permitting rotation in one direction only, the several locking devices each constructed to prevent rotation of the element held, in the power-transmitting direction, whereby said rotatable member is permitted to rotate in one direction on said movable element when locked, but rotation in the opposite direction is prevented.

15. In a power-transmission mechanism, a rotatable speed-changing system, means for holding a member of said system against rotation, said means comprising a stationary electromagnet and movable armature, a stationary member and the armature having coöperating locking devices, and also a roller clutch between said armature and said member, said clutch permitting rotation in one direction only, whereby said member is permitted to rotate in one direction on said armature when held, but not to rotate in a reverse direction.

16. In a speed-changing mechanism, the combination of a shaft, a sleeve structure surrounding said shaft having thereon a driving pinion and a flanged drum provided with slots for engaging a set of friction rings, a second slotted drum provided with slots for engaging a second set of friction rings, the sets of rings being alternately arranged and bearing at one end on the flange of the first drum, gears carried by said second drum in engagement with the pinion on the first drum, a spring-pressed sliding ring surrounding said first sleeve and bearing against the other end of said sets of friction rings, and means for withdrawing said ring against the pressure of the spring.

17. In a speed-changing mechanism, the combination of a shaft, a sleeve structure surrounding said shaft having thereon a driving pinion and a flanged drum provided with slots for engaging a set of friction rings, a second slotted drum provided with slots for engaging a second set of friction rings, the sets of rings being alternately arranged and bearing at one end on the flange of the first drum, gears carried by said second drum in engagement with the pinion on the first drum, a spring-pressed sliding ring surrounding said first sleeve and bearing against the other end of said sets of friction rings, and a stationary electromagnet for withdrawing said ring against the pressure of the spring and cooperating rotation-preventing means on said ring and electromagnet.

18. In a speed-changing mechanism, the combination of a shaft, a sleeve structure surrounding said shaft having thereon a driving pinion and a flanged drum provided with slots for engaging a set of friction rings, a second slotted drum provided with slots for engaging a second set of friction rings, the sets of rings being alternately arranged and bearing at one end on the flange of the first drum, gears carried by said second drum in engagement with the pinion on the first drum, a spring-pressed sliding ring surrounding said first sleeve and bearing against the other end of said sets of friction rings, means for withdrawing said ring against the pressure of the spring, and an over-running clutch connecting the shaft and sleeve structure.

19. In a speed-changing mechanism, the combination of a shaft, a sleeve structure surrounding said shaft having thereon a driving pinion and a flanged drum provided with slots for engaging a set of friction rings, a second slotted drum provided with slots for engaging a second set of friction rings, the sets of rings being alternately arranged and bearing at one end on the flange of the first drum, gears carried by said second drum in engagement with the pinion on the first drum, a spring-pressed sliding ring surrounding said first sleeve and bearing against the other end of said sets of friction rings, a stationary electromagnet for withdrawing said ring against the pressure of the spring, coöperating rotation-preventing means on said ring and a stationary member and an over-running clutch connecting the shaft and sleeve structure.

20. A power-transmission mechanism comprising a casing, a shaft extending therethrough, a speed-changing mechanism rotatable as a whole about said shaft and comprising a driving member and a driven member, each sleeved on said shaft, gearing connecting the driving and driven members and including a spring-pressed friction clutch, and means carried by the casing for withdrawing said spring and holding against rotation one member of the gearing to cause the driving and driven members to rotate at different speeds.

21. A power-transmission mechanism comprising a casing, a shaft extending therethrough, a speed-changing mechanism rotatable as a whole about said shaft and comprising a driving member and a driven member, each sleeved on said shaft, an over-running clutch connecting the shaft and driving member, gearing connecting the driving and driven members and including a spring-pressed friction clutch, and means carried by the casing for withdrawing said spring and holding against rotation one member of the gearing to cause the driving and driven members to rotate at different speeds.

22. A power-transmission system comprising a prime mover, a power shaft, a load shaft, a continuously acting yielding connection between the prime mover and the power shaft, and a speed-changing mechanism having as one element thereof a yielding friction clutch, connecting the power shaft and the load shaft.

23. A power-transmission system comprising a prime mover, a power shaft, a load shaft, a dynamo-electric clutch having one rotor connected to the prime mover and the other to the power shaft, and a speed-changing mechanism having as one element thereof a yielding friction clutch, connecting the power-shaft and the load-shaft.

24. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing gear system, a friction clutch, a stationary electromagnet, a movable armature member arranged to engage said clutch, a spring normally pressing said armature member against said clutch, and coöperating teeth on the armature and a stationary member to prevent rotation of said armature member, whereby energizing the magnet opens the clutch and locks the armature against rotation, and de-energizing the magnet automatically locks the clutch.

25. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing gear system comprising members connected by a multiple-disk clutch, a spring arranged to normally apply pressure against the disks of said clutch, and an electromagnetic device for overpowering the spring to relieve the pressure on the clutch, said device having means for mechanically preventing rotation of one of the released members.

26. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable driving member having a pinion, a rotatable driven member having a gear, a speed-changing train connecting said pinion and gear, a rotatable member carrying said train, a spring-pressed friction clutch connecting the driving member and the train-carrying member, means for overcoming the spring pressure to open the clutch, and means for locking said train-carrying member against rotation comprising a stationary locking element and a rotatable spring-carrying locking element.

27. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable driving member having a pinion, a rotatable driven member having a gear, a speed-changing train connecting said pinion and gear, a rotatable member carrying said train, a spring-pressed friction clutch connecting the driving member and the train-carrying member, means for overcoming the spring pressure to open the clutch, means for locking said train-carrying member against rotation comprising a stationary locking element and a rotatable spring-carrying locking element, and an over-running clutch between the rotatable locking element and the rotatable train-carrying member.

28. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable driving member, a rotatable driven member, gearing for transmitting motion from one to the other, a driving shaft, and an over-running clutch between the driving shaft and driving member.

29. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable driving member, a rotatable driven member, gearing for transmitting motion from one to the other, a rotatable member carrying said gearing, a rotatable clutch for holding against relative rotation the driving member and gear-carrying member, a driving shaft and an over-running clutch between the driving shaft and driving member.

30. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable driving member, a rotatable driven member, gearing for transmitting motion from one to the other, a rotatable member carrying said gearing, a rotatable clutch for holding against relative rotation the driving member and gear-carrying member, a driving shaft, an over-running clutch between the driving shaft and driving member, and means for releasing the rotatable clutch and holding against rotation one member of the gearing.

31. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable driving member, a rotatable driven member, gearing for transmitting motion from one to the other, a member carrying said gearing, a friction clutch for holding against relative rotation the driving member and gear-carrying member, a driving shaft, an over-running clutch between the driving shaft and driving member, and means for releasing the friction clutch and holding against rotation one member of the gearing.

32. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a driving shaft, a driven shaft, a motion-transmitting gearing system arranged to rotate as a whole about said driving shaft, and an over-running clutch connection between the driving shaft and said motion-transmitting system.

33. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a driving shaft, a driving member for the gear system having a pinion, and an over-running clutch between the shaft and driving member, whereby the gear system may be timed prior to changing gear ratios and coasting of the load is permitted without driving the driving shaft.

34. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a driving shaft, a driven shaft, a speed-changing gear system arranged to rotate as a whole about said driving shaft, means for holding against rotation one element of the speed-changing gear, and an over-running clutch between said element and said holding means.

35. A power transmission system comprising a prime mover, a power shaft, a load shaft, a dynamo-electric clutch having one rotor connected to the prime mover and the other rotor connected to the power shaft and a transmission mechanism between the power shaft and load shaft comprising a driving shaft, a driven shaft, a speed-changing gear system arranged to rotate as a whole about said driving shaft, means for holding against rotation one element of the speed-changing gear, an over-running clutch between said element and said holding means, and a second over-running clutch between the driving shaft and the rotating gear system.

36. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing system, means for locking a member of said system against rotation, said means comprising stationary and movable elements having coöperating locking devices and also a roller clutch between said movable element and said member, said clutch permitting rotation in one direction only, whereby said rotatable member is permitted to rotate in one direction on said movable element when locked, but rotation in the opposite direction is prevented.

37. A power-transmission system comprising a prime mover, a power shaft, a load shaft, a dynamo-electric clutch, having one rotor connected to the prime mover and the other rotor connected to the power shaft and a transmission mechanism between the power shaft and load shaft comprising a rotatable speed-changing system, means for locking a member of said system against rotation, said means comprising stationary and movable elements having coöperating locking devices and also a roller clutch between said movable element and said member, said clutch permitting rotation in one direction only, the several locking devices each constructed to prevent rotation of the element held, in the power-transmitting direction, whereby said rotatable member is permitted to rotate in one direction on said movable element when locked, but rotation in the opposite direction is prevented.

38. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing system, means for locking a member of said system against rotation, said means comprising a stationary electromagnet and movable armature, a stationary member and the armature having coöperating locking devices, and also a roller clutch between said armature and said member, said clutch permitting rotation in one direction only, whereby said member is permitted to rotate in one direction on said armature when locked but not to rotate in a reverse direction.

39. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a casing, a shaft extending therethrough, a speed-changing mechanism rotatable as a whole about said shaft and comprising a driving member and a driven member, each sleeved on said shaft, gearing connecting the driving and driven members and including a spring-pressed friction clutch, and means carried by the casing for withdrawing said spring and holding against rotation one member of the gearing to cause the driving and driven members to rotate at different speeds.

40. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a casing, a shaft extending therethrough, a speed-changing mechanism rotatable as a whole about said shaft and comprising a driving member and a driven member, each sleeved on said shaft, an over-running clutch connecting the shaft and driving member, gearing connecting the driving and driven members and including a spring-pressed friction clutch, and means carried by the casing for withdrawing said spring and holding against rotation one member of the gearing to cause the driving and driven members to rotate at different speeds.

41. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising an electromagnet and an armature and coöperating means on a stationary member and armature for positively locking the armature to the magnet against rotation.

42. In a power-transmission mechanism, a rotatable speed-changing system, means for holding a member of said system against rotation, said means comprising stationary and movable elements and also a roller clutch between said movable element and said member, said clutch permitting rotation in one direction only, whereby said rotatable member is permitted to rotate in one direction on said movable element when held, but rotation in the opposite direction is prevented.

43. In a power-transmission mechanism, a rotatable speed-changing system, means for holding a member of said system against rotation, said means comprising stationary and movable elements and also a roller clutch between said movable element and said member, said clutch permitting rotation in one direction only, the several holding devices each constructed to prevent rotation of the element held, in the power-transmitting direction, whereby said rotatable member is permitted to rotate in one direction on said movable element when held, but rotation in the opposite direction is prevented.

44. In a power-transmission mechanism, a rotatable speed-changing system, means for holding a member of said system against rotation, said means comprising a stationary electromagnet and movable armature, and also a roller clutch between said armature and said member, said clutch permitting rotation in one direction only, whereby said member is permitted to rotate in one direction on said armature when held, but not to rotate in a reverse direction.

45. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing system, means for holding a member of said system against rotation, said means comprising stationary and movable elements and also a roller clutch between said movable element and said member, said clutch permitting rotation in one direction only, whereby said rotatable member is permitted to rotate in one direction on said movable element when held, but rotation in the opposite direction is prevented.

46. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing system, means for holding a member of said system against rotation, said means comprising stationary and movable elements and also a roller clutch between said movable element and said member, said clutch permitting rotation in one direction only, the several holding devices each constructed to prevent rotation of the element held, in the power-transmitting direction, whereby said rotatable member is permitted to rotate in one direction on said movable element when held, but rotation in the opposite direction is prevented.

47. A power-transmission system comprising a prime mover, a power shaft, a load shaft, a dynamo-electric clutch having one rotor connected to the prime mover and the other rotor connected to the power shaft and a transmission mechanism between the power shaft and load shaft comprising a rotatable speed-changing system, means for holding a member of said system against rotation, said means comprising a stationary electromagnet and movable armature, and also a roller clutch between said armature and said member, said clutch permitting rotation in one direction only, whereby said member is permitted to rotate in one direction on said armature when held, but not to rotate is a reverse direction.

48. A power-transmission system comprising a prime mover, a power shaft, a load shaft, a yielding connection between the prime mover and the power shaft, and a speed-changing mechanism, having as one element thereof a yielding friction clutch and also an over-running clutch, connecting the power shaft and the load shaft.

49. A power-transmission system comprising a prime mover, a power shaft, a load shaft, a dynamo-electric clutch having one rotor connected to the prime mover and the other to the power shaft, and a speed-changing mechanism having as one element thereof a yielding friction clutch, and also an over-running clutch, connecting the power shaft and the load shaft.

50. A power-transmission system comprising a prime mover, a power shaft, a load shaft, a yielding connection between the prime mover and the power shaft, and a speed-changing mechanism, having as one element thereof a yielding friction clutch and also over-running clutches, connecting the power shaft and the load shaft.

51. A power-transmission system comprising a prime mover, a power shaft, a load shaft, a dynamo-electric clutch having one rotor connected to the prime mover and the other to the power shaft, and a speed changing mechanism having as one element thereof a yielding friction clutch and also over-running clutches, connecting the power shaft and the load shaft.

52. A planetary gear system comprising two or more revoluble members, intermeshing gears mounted on these revoluble members, means for locking the revoluble members to rotate together with gears in mesh, and electro-magnetic means for unlocking these members and holding one member against rotation while the other can be rotated through the gears.

53. A planetary gear system comprising a driving shaft, a driving gear, gear-carrying members revolubly mounted on said shaft, gears mounted on the revoluble members, all the gears being in mesh, means for locking the gear-carrying members together comprising a spring-pressed armature, and a stationary electro-magnet for disengaging the lock and holding stationary one of the gear-carrying members.

54. A speed-changing gear system comprising two or more revoluble members, intermeshing gears mounted on these revoluble members, means for locking the revoluble members to rotate together with gears in mesh, and electro-magnetic means for unlocking these members and holding one member against rotation while the other can be rotated through the gears.

55. A speed-changing gear system comprising a driving shaft, a driving gear, gear-carrying members revolubly mounted on said shaft, gears mounted on the revoluble members, all the gears being in mesh, means for locking the gear-carrying members together comprising a spring-pressed armature, and a stationary electro-magnet for disengaging the lock and holding stationary one of the gear-carrying members.

56. A speed-changing gear system comprising a driving shaft, a driving gear, gear-carrying members revolubly mounted on said shaft, gears mounted on said members, means comprising an electro-magnetic system having one element thereof constructed to lock the gear-carrying members against relative rotation and another element for disengaging the lock and holding against rotation one of the gear-carrying members.

57. A driving shaft and a driven shaft connected through a series of speed-changing gear systems, each system comprising a driving member, a driven member, gears connecting such members, spring controlled means for holding the gears against relative rotation, and electro-magnetic means for holding one element of the system against rotation.

58. A driving shaft and a driven shaft connected through a series of speed-changing gear systems, each system comprising a driving member, a driven member, gears connecting such members, spring controlled means for holding the gears against relative rotation, and electro-magnetic means for holding one element of the system against rotation, the driven member of one system being the driving member of the next system.

59. A speed-changing gear-system having means for locking the gears against relative rotation to thereby transmit power at unchanged speed in the given direction, and having electrical means for unlocking and holding against rotation one member of the gear-train which tends to rotate in a reverse direction, thereby producing the change of speed.

60. A power shaft and a load driving shaft connected through a series of speed-changing gear-systems; each system having spring controlled means for locking the gears against relative rotation to thereby transmit power at unchanged speed in a given direction, and electrical means for unlocking and holding against rotation one member of the gear-train which tends to rotate in a reverse direction, whereby the speed change is produced; the driven member of each gear system connected to act as the driving member of a succeeding system, whereby each system may act individually or in combination with others.

In testimony whereof I affix my signature.

WILLIAM MORRISON.